(12) United States Patent
Fushimi et al.

(10) Patent No.: US 6,840,567 B2
(45) Date of Patent: Jan. 11, 2005

(54) SLIDING DOOR STRUCTURE FOR VEHICLE

(75) Inventors: Toru Fushimi, Hiroshima (JP);
Toshinori Sakamoto, Hiroshima (JP);
Masato Ogawa, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/629,841

(22) Filed: Jul. 30, 2003

(65) Prior Publication Data

US 2004/0094991 A1 May 20, 2004

(30) Foreign Application Priority Data

Jul. 31, 2002 (JP) ........................................ 2002-222369
Jul. 31, 2002 (JP) ........................................ 2002-222370

(51) Int. Cl.[7] .............................................. B60J 10/08
(52) U.S. Cl. ..................................................... 296/155
(58) Field of Search ................................. 296/155, 147, 296/146.1; 49/210, 211

(56) References Cited

U.S. PATENT DOCUMENTS

| | | | | |
|---|---|---|---|---|
| 3,360,295 A | * | 12/1967 | Reynolds | 296/190.04 |
| 3,759,566 A | * | 9/1973 | Sobey et al. | 296/155 |
| 4,135,760 A | | 1/1979 | Grossbach | |
| 4,561,690 A | * | 12/1985 | Shinjo et al. | 296/155 |
| 5,398,988 A | * | 3/1995 | DeRees et al. | 296/155 |
| 6,183,039 B1 | | 2/2001 | Kohut et al. | |
| 6,382,705 B1 | * | 5/2002 | Lang et al. | 296/146.12 |

FOREIGN PATENT DOCUMENTS

| | | |
|---|---|---|
| DE | 198 24 404 A | 12/1999 |
| JP | 5-199217 | 11/1983 |
| JP | 58-199217 | * 11/1983 |
| JP | 63-13817 | * 1/1988 |
| JP | 63-222922 | * 9/1988 |
| JP | 04-339017 A | 11/1992 |
| JP | 5-178087 A | 7/1993 |

OTHER PUBLICATIONS

Patent Abstracts of Japan vol. 013, No. 013 (M–783), Jan. 12, 1989 & JP 63 222922 A (Daihatsu Motor Co. Ltd.), Sep. 16, 1988 *Abstract*.

* cited by examiner

*Primary Examiner*—Joseph D. Pape
(74) *Attorney, Agent, or Firm*—Nixon Peabody LLP; Donald R. Studebaker

(57) ABSTRACT

A sliding door structure for a vehicle having a continuous door opening consisting of a side opening formed in a side body panel and a roof opening formed un a roof panel comprises a generally reverse L-shaped sliding door having a side portion in conformity with the side opening and a roof portion in conformity with the roof opening and a door guide structure operative to guide the sliding door in a lengthwise direction between a closed position and an open position, the door guide structure consisting of an upper guide rail for supporting a middle portion of the sliding door and a lower base guide rail slidably support a lower end of the sliding door.

10 Claims, 13 Drawing Sheets

SLIDING DOOR STRUCTURE FOR VEHICLE

BACKGROUND OF THE INVENTION

1. Field of the Invention

The present invention relates to a sliding door structure for a vehicle with a side panel such as a cab side for covering the side of a vehicle body and a roof connected to the side panel for covering the top of the vehicle body.

2. Description of Related Art

One of prior art door structures for a vehicle of a type that is provided with a side panel such as a cab side for covering the side of a vehicle body and a roof connected to the side panel for covering the top of the vehicle body is disclosed in, for example, Unexamined Japanese Patent Publication No. 04 (1992)-339017. This type of vehicle, e.g. a one-box car, has a side door opening formed as an access opening to a rear sheet in the side panel and a side door slidably mounted on one side of a vehicle body for movement between a closed position in the side door opening and an open position wherein the side door extends along the outer surface of the side panel to fully expose the access opening. The vehicle body is provided with overhead, middle or center and lower guide rails. The side door is slidably connected to the guide trucks so as to travel between the closed position and the open position in a lengthwise direction of the vehicle body.

This type of one-box car has a center guide rail installed to an outer side body panel and, inconsequence, the one-box car often looks unattractive in outer appearance. On the other hand, the one-box car, that has a comparatively high vehicle height, has no particular problem with facility and convenience of getting on and off the car. However, sporty vehicles, that are generally made low in vehicle height in light of design requirements, have a problem with facility and convenience of getting on and off the car in such the case where a sliding door opens and closes an access opening defined within a side body panel only. In particular, in the case where the sporty car is equipped with a sliding door slidably mounted to the car body through overhead, center and lower guide rails, the overhead guide rail constitutes a limiting factor of good facility and convenience of getting on and off the car.

A combination of such a sliding door and a roof door such as disclosed in Unexamined Japanese Patent Publication No. 05 (1993)-339017 is one of solutions to the problem of facility and convenience of getting on and off. However, the combination door imposes on a passenger the troublesome operation that the passenger has to operate both sliding door and roof door independently when getting on and off the car. This door operation resists good facility and convenience of getting on and off the car. In light of these problems, it appears suitable for eliminating the problem to provide a car with a door opening extending from a side body to a roof and a single sliding door having a side door portion in conformity in configuration with a side opening portion and a roof door portion in conformity in configuration with a roof opening portion. In this instance, the sliding door structure deeds a mechanism for moving the sliding door rearward in a lengthwise direction of the car after drawing the roof door portion laterally away from the roof opening in order to open the door opening. This mechanism and door operation leads to a large distance of lateral movement of the sliding door.

It is therefore an object of the present invention to provide a door structure for a vehicle with a door opening extending from a side door panel to a roof in which a sliding door having a side door portion and a roof door portion.

SUMMARY OF THE INVENTION

It is therefore an object of the present invention to provide a sliding door structure which has a side portion and a roof opening portion for a vehicle having a door opening extending from a side body panel to a roof panel of a vehicle body.

It is another object of the present invention to provide a sliding door structure which can opens a door opening extending a side body panel to a roof panel of a vehicle body completely by a short distance of lateral shift movement of the side door and, in consequence, provides improved facility and convenience of getting on and off the vehicle.

The foregoing objects of the present invention are accomplished by a sliding door structure for a vehicle having a door opening extending from a side body panel of a vehicle body to a roof panel of a vehicle body which comprises a generally reverse L-shaped sliding door having a side portion in conformity in configuration with the side opening portion of the door opening and a roof portion in conformity in configuration with a roof opening portion of the door opening.

According to an embodiment of the present invention, the sliding door structure comprises a sliding door slidably mounted on each of opposite sides of a vehicle body for sliding movement in a lengthwise direction of the vehicle body between a closed position in the door opening and an open position wherein the sliding door extends along an outer surface of the side body panel to fully expose the door opening and guide means for causing the sliding door to put the roof portion substantially flush with the roof panel in the closed position and to shift and swing outward in a transverse direction of the vehicle body so as to cause the roof portion of the sliding door to come out of the roof opening portion of the door opening completely and to travel rearward in the lengthwise direction when the slide door is opened.

The guide means may comprise an upper guide rail assembly for guiding sliding movement in a lengthwise direction of the slide door, a lower base guide rail for shifting the slide door in a transverse direction and swinging means for causing the slide door to swing in a transverse direction when the slide door is pulled obliquely rearward from the outside of the vehicle body or pushed obliquely rearward from the inside of the vehicle body opened to expose the door opening. The guide means causes the slide door to swing and shift laterally outward so as thereby to draw the roof portion away from the roof opening portion and to travel rearward when opening. Therefore, the slide door adapted to close up even the door opening having a side opening portion and a roof opening portion without laterally shifting a large distance.

Because the guide means has no overhead guide rail, the sliding door having the side portion and the roof portion is opened without aggravating facility and convenience of getting on and off the vehicle.

The guide means may cause the swinging movement and the shifting movement of said sliding door simultaneously with the rearward sliding movement of the sliding door. This prevents the slide door from mechanically interfering with the vehicle body and, in consequence, provides improved facility and convenience of getting on and off the vehicle.

The guide means may be structured so as to put the sliding door inclined laterally inward in the door opening and to causes the sliding door to shift the slide door laterally outward so as to put a lower end of the slide door at a lower distance from the vehicle body and to swing laterally outward so as to put an upper end of the slide door at an upper distance greater than the lower distance from the vehicle body. The slide door structure enables to incorporate the reverse L-shaped door to a vehicle body while satisfying design requirements for the vehicle body and, in addition, realizes smooth opening and closing movement of the slide door without mechanically interfering with the vehicle body due to a difference of lateral distances between the upper and lower ends of the slide door.

According to another embodiment of the present invention, the sliding door structure comprises a sliding door slidably mounted on each of opposite sides of a vehicle body for sliding movement of the sliding door in a lengthwise direction of the vehicle body between a closed position in the door opening and an open position wherein the sliding door extends along an outer surface of the side body panel to fully expose the door opening and guide means that comprises an upper slide guide assembly, a base slide guide rail and a swinging mechanism. The upper slide guide rail assembly comprises a rear guide rail secured to a middle portion of the vehicle body in a vertical direction and a front slider slidably mounted for slide movement to the rear guide rail so as to slide to overlap the rear guide rail when the sliding door travels in the lengthwise direction. The base slide guide rail is secured to a vehicle body and connected to the sliding door so as to force a lower end of the sliding door to shift a lateral distance, more preferably obliquely rearward, at the beginning of opening the sliding door. The swinging mechanism is operationally connected between the front slider and the slide door and operates to cause an upper end of the sliding door to swing laterally simultaneously with the obliquely rearward shift movement of the sliding door. This sliding door structure causes the generally reverse L-shaped sliding door to open with improved facility and convenience of getting on and off the vehicle.

The swing mechanism may comprise a parallel link mechanism which is simple in mechanism. The swinging mechanism may incorporate tilting means for providing an inclination of the sliding door in a door opening.

In the case where the sliding door structure is incorporated in a vehicle body equipped with a front door opening adjacent to the door opening that is opened and closed by a front door hinged to the vehicle body at a front end thereof, the sliding door may be provided with sealing means such as a rubber sealing strip secured to a forward end of the sliding door so that the sealing means is brought into abutment against a rearward end of the front door in the front door opening and overlaps an inner rear edge of the front door when the sliding door is completely put in the door opening.

The upper slide guide assembly may be disposed so as to jut out into a passenger compartment of the vehicle body. The sliding door structure provides an improved attractive outer appearance of the vehicle body and, in addition, allows the upper guide rail assembly to have any desired configuration without being dependent on shapes of vehicle body. The upper guide rail assembly can be long in order to provide a wide access opening. When providing the upper slide guide assembly with a flat upper surface, the upper slide guide assembly can be utilized as an arm rest.

The upper slide guide assembly may have a nested construction comprising a rear guide rail extending in the lengthwise direction and secured to the vehicle body and a front slider slidably mounted for slide movement to the rear guide rail and being put alongside the sliding door in the door opening. The front slider is guided by and slides on the rear guide rail so as to overlap the rear guide rail when the sliding door travels in the lengthwise direction to open the door opening. The nested structure of the upper slide guide assembly provides improved facility and convenience of getting on and off the vehicle because a passenger is required to operate the front slider. Both front slider and rear guide rail may be utilized as arm rests.

BRIEF DESCRIPTION OF THE DRAWINGS

The above and other objects and features of the present invention will be understood from the following description of a specific embodiment thereof when considering in conjunction with the accompanying drawings, in which.

DETAILED DESCRIPTION OF THE SPECIFIC EMBODIMENT

Figure 1:
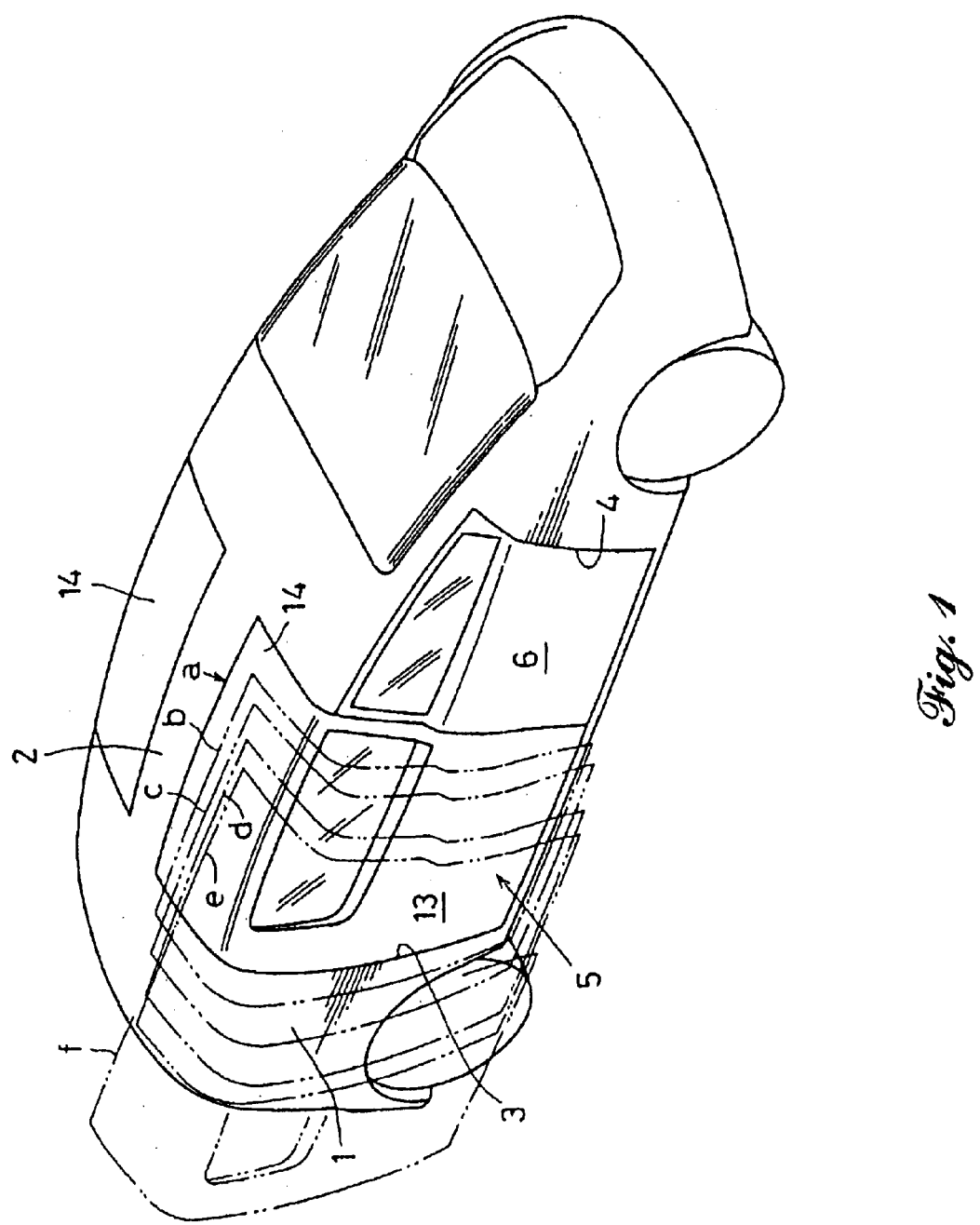
FIG. 1 is a perspective view of a vehicle body equipped with a sliding door structure according to an embodiment of the present invention.
Figure 2:
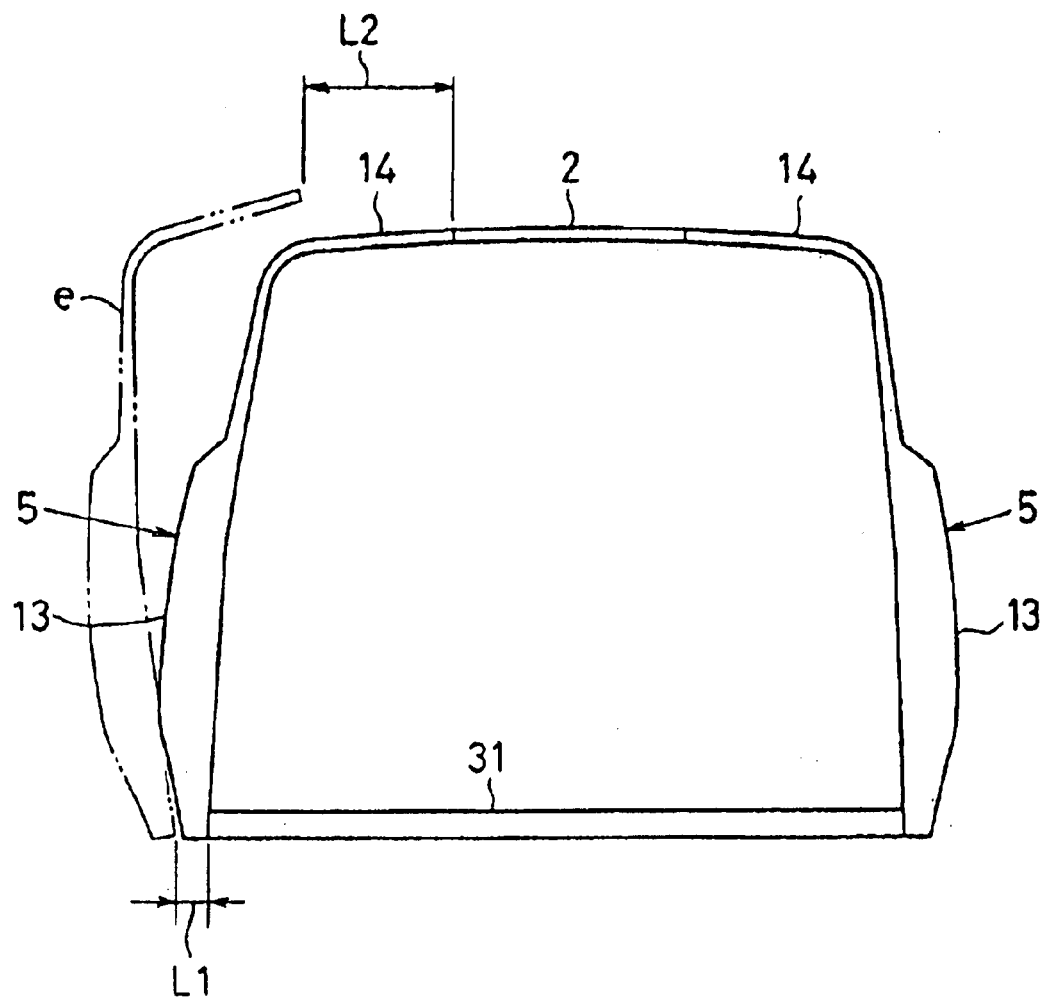
FIG. 2 is a front view of a portion of the vehicle body wherein the sliding door is installed.

Referring to the drawings in detail, and, in particular, to FIGS. 1 and 2 showing a sliding door structure for a vehicle according to an embodiment of the present invention, the vehicle body has what is called a cab side, namely a side body panel 1, and a roof pane 2. The side body panel 1 extends substantially vertically and forms each of opposite side walls of the vehicle body. The roof panel 2 substantially horizontally extends so as to close up the top of the vehicle body. The side panels 1 and the roof panel 2 are integrated with one another. The vehicle body has a door opening 3 formed as an access opening to rear sheets in the side body panel 1 at each of the opposite sides thereof and a door opening 4 formed as an access opening to a front seat in the side body panel 1 at each of the opposite sides thereof. The door opening 3 extends from the side body panel 1 to the roof panel 2, in other words, has a side opening portion formed in the side body panel 1 and a roof opening portion formed in the roof panel 2. The vehicle body at opposite sides is equipped with sliding doors 5 (only one of which, namely a right side sliding door is shown). The sliding door 5 is slidably mounted for movement between a closed position in the door opening 3 and a fully open position wherein the sliding door 5 extends along the outer surface of a rear portion of the side panel 2 to expose the access opening, i.e. the door opening 3, entirely. The sliding door 5 has a generally reverse L-shaped configuration having a side portion 13 in conformity in configuration with the side opening portion of the door opening 3 and a roof portion 14 in conformity in configuration with the roof opening portion of the door opening 3. The vehicle body is so shaped that the sliding door 5 in the door opening 3 leans inward in a transverse direction on body design requirements and, however, the sliding door 5 in the fully open position is put substantially upright for door opening and closing operation. The vehicle body is further equipped with a front door 6 pivotally mounted for movement between a closed position in the door opening 4 and en open position wherein the front door 6 exposes the access opening.

Figure 3:
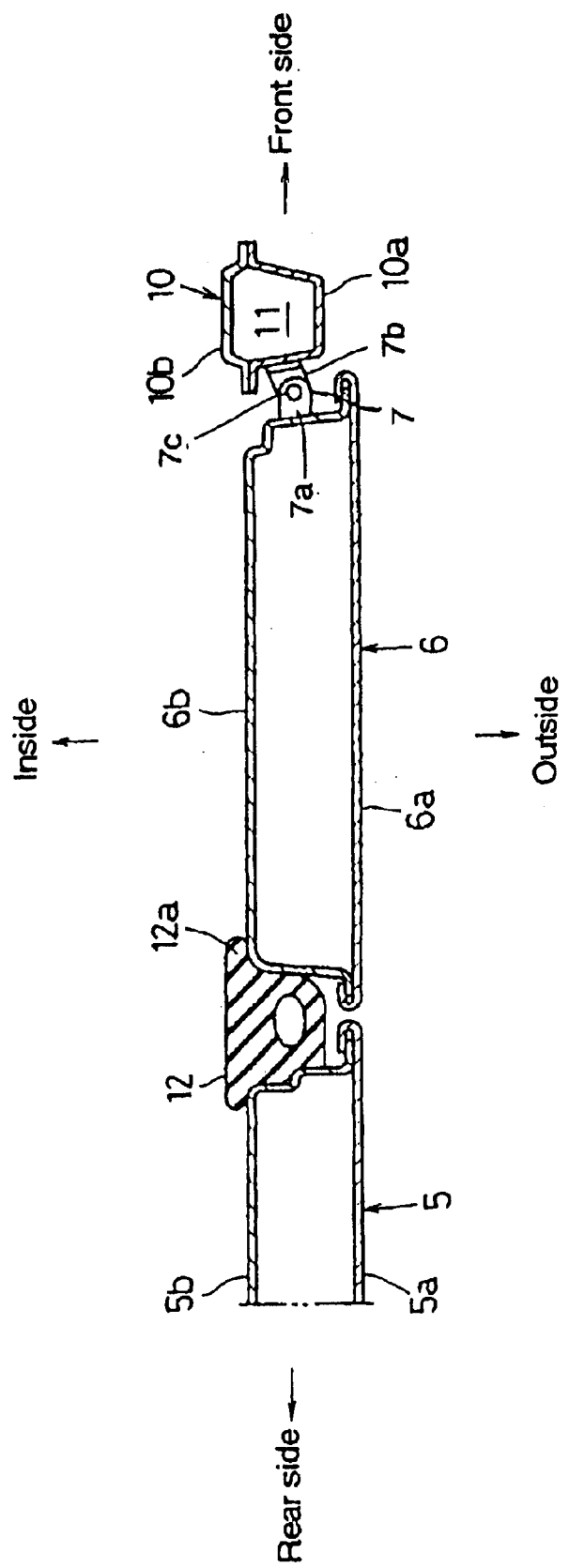
FIG. 3 is a plane view of a sealing structure between the sliding door and a front door.

As shown in FIG. 3, the front door 6 comprises a door outer panel 6a and a door inner panel 6b and pivotally connected at its front end to a pillar 10 of the vehicle body through a hinge means 7. The hinge means comprises a door hinge leaf 7a secured to the door inner panel 6b and a body hinge leaf 7b secured to the pillar 10 which are connected by a pivot pin 7c. The pillar 10 comprises a generally U-shaped pillar outer panel 10a and a pillar inner panel 10b which are welded, or otherwise secured, to each other to provide a vertical square space 11 therebetween, so that the pillar 10 functions as a rigid member. The sliding door 5 comprises a door outer panel 5a and a door inner panel 5b. The sliding door 5 is fixedly equipped with a sealing strip 12 such as a rubber strip along its front edge. When the sliding door 5 travels into the door opening 3, the sealing strip 12 is brought into abutment against the rear edge of the front door 6 in the closed position. The sealing strip 12 has a sealing rips 12a that extends along a rear corner edge of the front door 6 when the sliding door 5 is in the door opening 3. In this manner, there is provided a tight seal between the sliding door 5 and the front door in their closed positions.

Returning to FIGS. 1 and 2, when the sliding door 5 is in the closed position as shown by a solid line in FIG. 1, the side position 13 and the roof portion 14 are substantially flush with a substantially flat or curved surfaces of the side body panel 1 and the roof panel 2, respectively. As clearly shown in FIG. 2, the vehicle body is so shaped that the sliding door 3 in the door opening 3 leans inward in a transverse direction in view of body design requirements.

The sliding door 5 travels rearward from the closed position (shown by a position a) as shown by a solid line to the full open position (shown by a position f) passing through positions b, c, d and e shown by double dotted lines as shown in FIG. 1. When the sliding door 5 is obliquely pulled rearward from the outside of the vehicle or pushed obliquely rearward from the inside of the vehicle to expose the access opening, i.e. the door opening 3, while the sliding door 5 travels obliquely rearward from the closed position (position a) to the position e, the sliding door 5 swings and shifts laterally outward. In the position e, the sliding door 5 is put substantially upright. After the position e, the sliding door 5 travels rearward in a straight line to the open position (position f) keeping itself upright. When a passenger opens the sliding door 5 from the outside of the vehicle, the passenger is enabled to pull and move the sliding door 5 without bending himself back.

Figure 4:
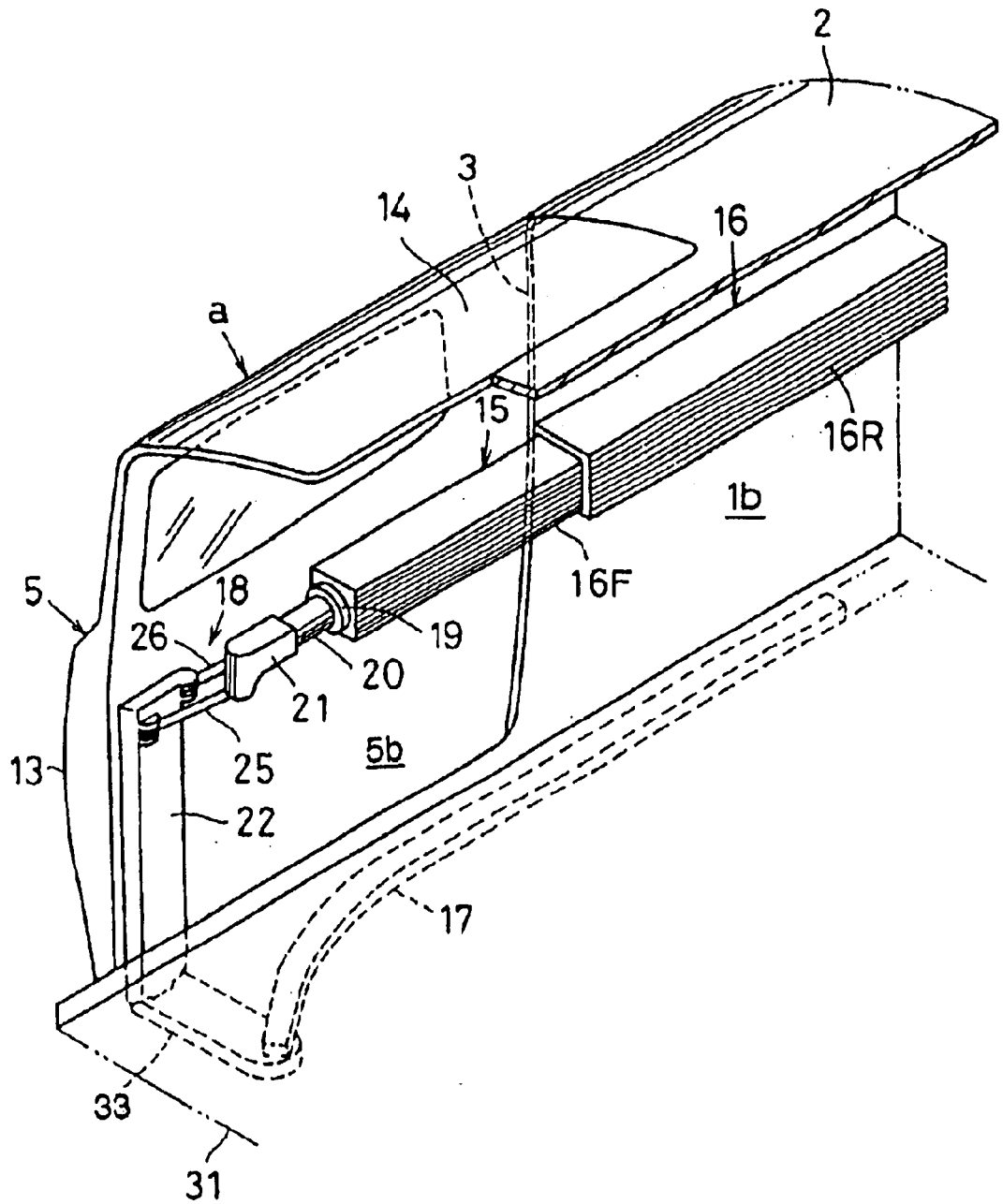
FIG. 4 is a perspective view of the sliding door structure.
Figure 5:
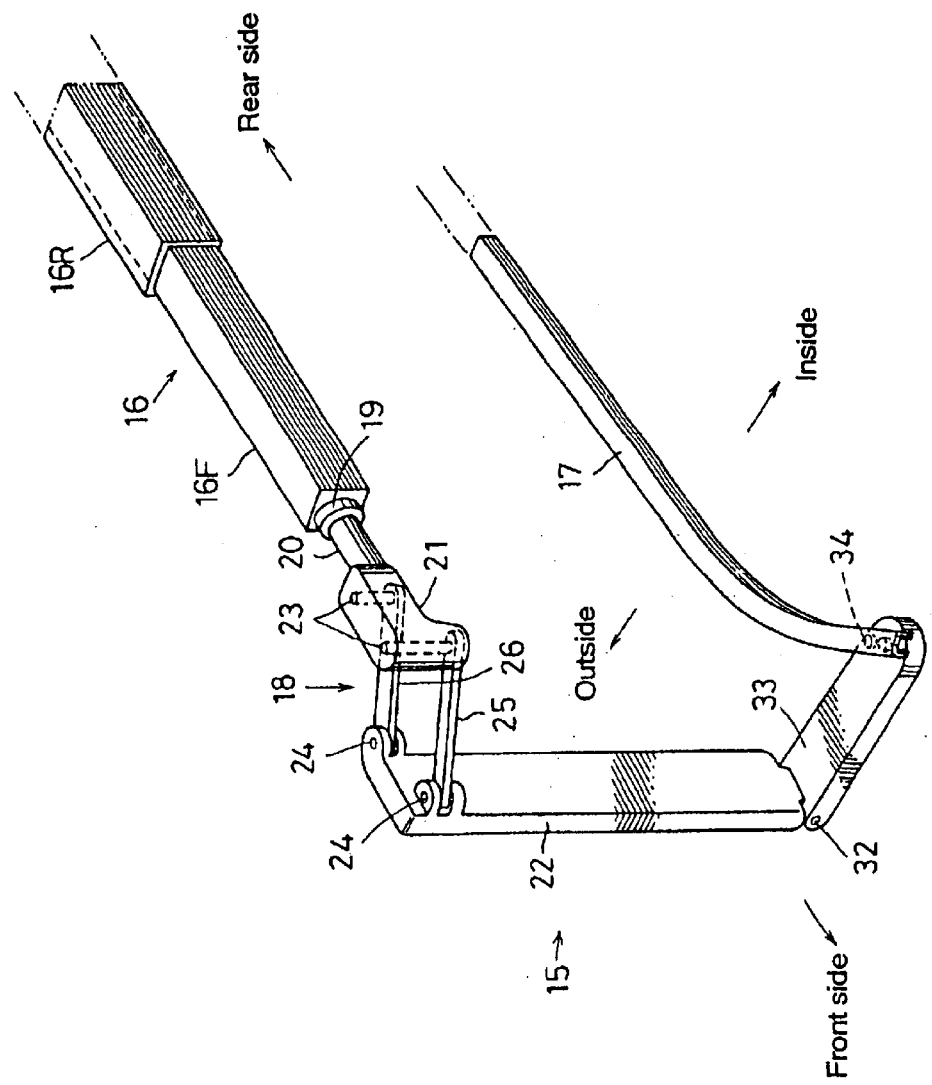
FIG. 5 is a perspective view of guide means of the sliding door structure.

In order to achieve the swinging and sliding movement of the sliding door 5, the vehicle body is equipped with a door guide mechanism 15 as shown in detail in FIGS. 4 and 5. The same door guide mechanism is provided for another sliding door at another side of the vehicle body and symmetrical to the door guide mechanism 15 with respect to a center line of the vehicle body.

Referring to FIGS. 4 and 5, the door guide mechanism 15 puts the sliding door 5 to be flush with the side body panel 1 and the roof panel 2 in the closed position and causes the sliding door 5 to swing or incline laterally and outward travel rearward so as to put the roof portion 14 thereof laterally off from the roof 2 while the sliding door 5 is in the open position. More specifically, the door guide mechanism 15 comprises an upper guide rail assembly 16, a lower base guide rail 17 and a parallel link mechanism 18 connected to a front end of the upper guide rail assembly 16. The lower base guide rail 17 comprises a curved front rail portion and a straight rail portion which are formed as an integral member. The upper guide rail assembly 16 is positioned desirably at a level of a vertically middle position of the sliding door 5 wherein an arm rest is disposed and secured to the side body panel 1. The parallel link mechanism 18 causes a change in geometrical arrangement between a folded position shown in FIG. 7 and an expanded position shown in FIG. 6.

The upper guide rail assembly 16 has a nested construction comprising a rear guide rail 16R formed by a boxed channel member and a front slider 16F fitted for sliding movement in a lengthwise direction in the rear guide rail 16R. The rear guide rail 16R is welded, or otherwise secured, to an inner panel 1b of the side body panel 1 at the inner side and juts out into a passenger compartment of the vehicle body. It is preferred to mount the rear guide rail 16R in a horizontal position so as to utilize it as an arm rest. The front slider 16F, that is exposed to the passenger compartment of the vehicle, protrudes from the rear guide rail 16R when the sliding door 5 travels toward the closed position and retracts into the rear guide rail 16R when the sliding door 5 travels toward the open position. It is also preferred to mount the front slider 16F in a horizontal position so as to utilize it as an arm rest while the sliding door 5 is in the closed position. Although not shown in FIGS. 4 and 5, it is preferred to cover at least top surfaces of the rear guide rail 16R and the front slide 16F with trim members, respectively. The front slider 16F at its front end is fixedly provided with a bearing 19 that bears a connecting shaft 20 of the parallel link mechanism 18.

Figure 6:
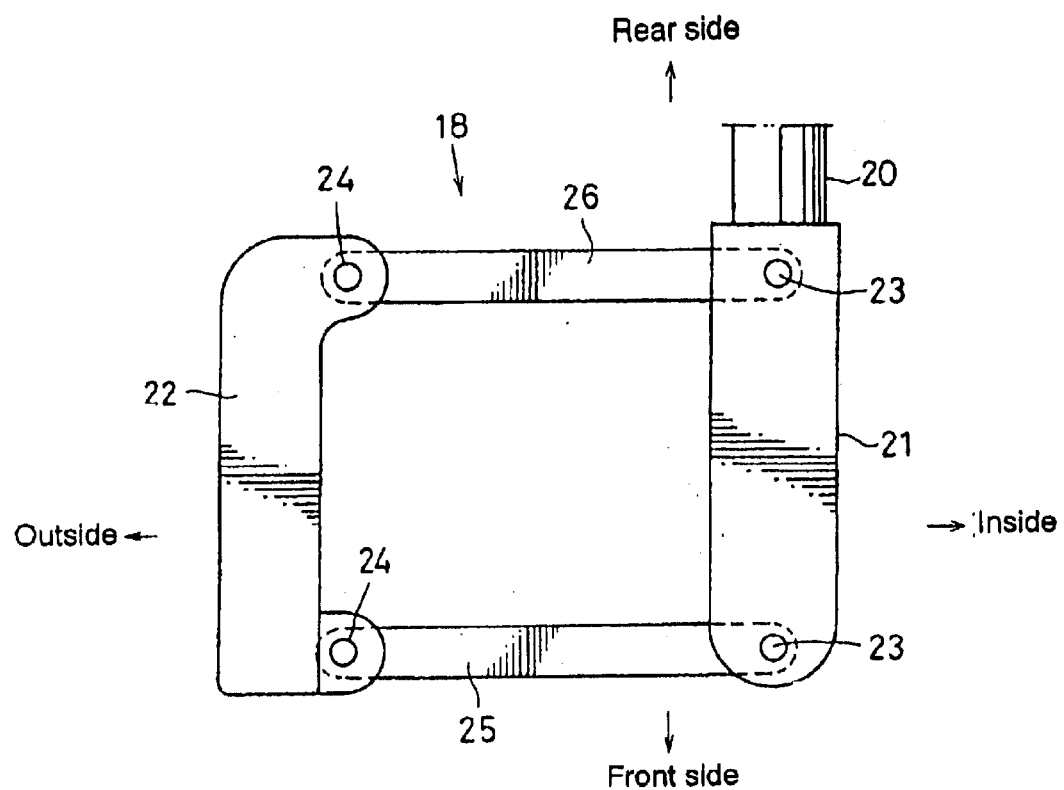
FIG. 6 is a plane view of a parallel link mechanism in an expanded position.
Figure 7:
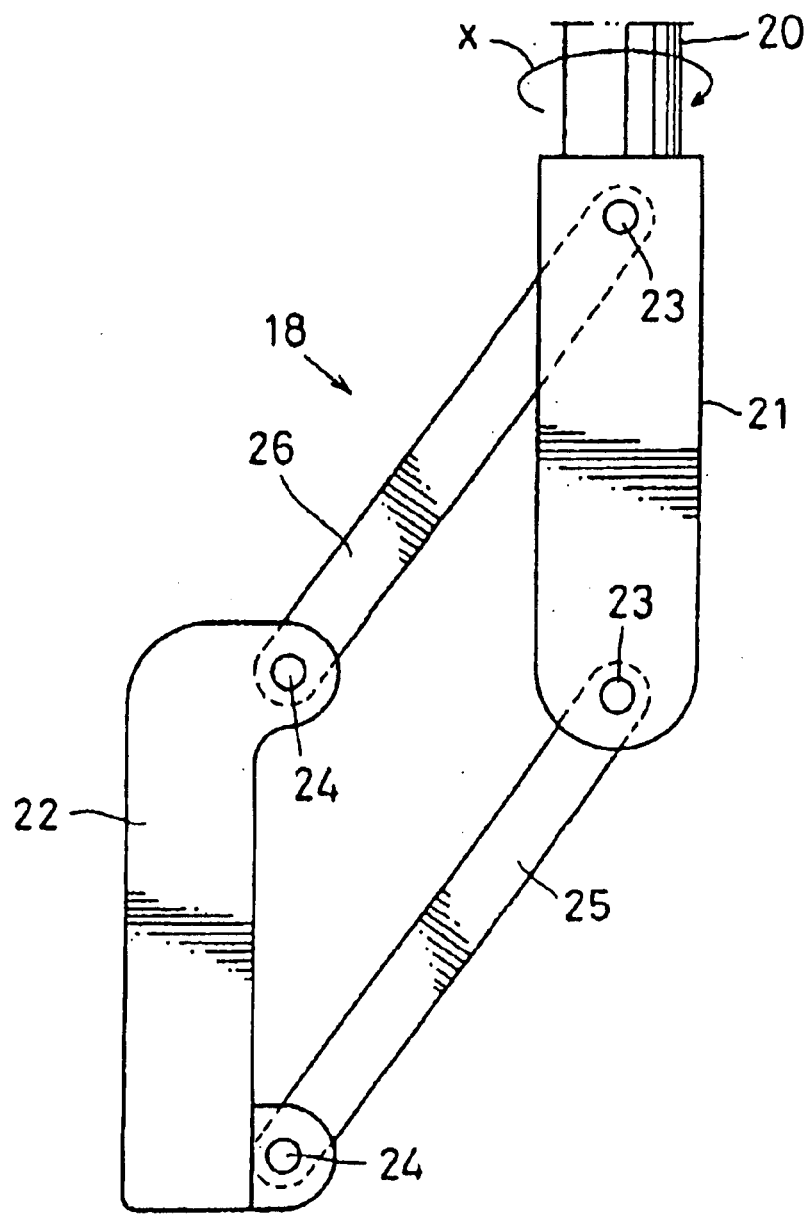
FIG. 7 is a plane view of a parallel link mechanism in an folded position.

Referring to FIGS. 6 and 7, the parallel link mechanism 18 comprises a connecting block 21 secured to the connecting shaft 20, a bracket 22 welded, or otherwise secured, to the side portion 13 of the door inner panel 5b and a pair of link arms 25 and 26 which are connected for pivotal movement to both the connecting block 21 and the bracket 22 by link pins 23 and 24, respectively. The parallel link mechanism 18, more specifically the bracket 22, is pivotally connected to a bracket arm 33 by a pivot pin 32. The bracket arm 33 is slidably connected to the lower base guide rail 17 by means of guide rollers 34 as will be described later.

The parallel link mechanism 18 itself operates such that, when the sliding door 5 travels in a lengthwise direction, the parallel link mechanism 18 causes a change in geometrical arrangement between an expanded position shown in FIG. 6 and a folded position shown in FIG. 7, so that the bracket 22, and hence the sliding door 5 to which the bracket 22 is secured, swings in a transverse direction about the pivot pin 32.

Figure 8A:
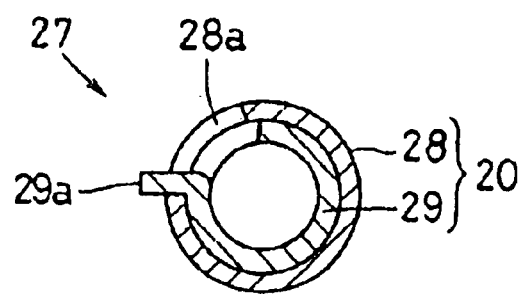
FIG. 8 is a cross-sectional view of tilting mechanism.
Figure 8B:
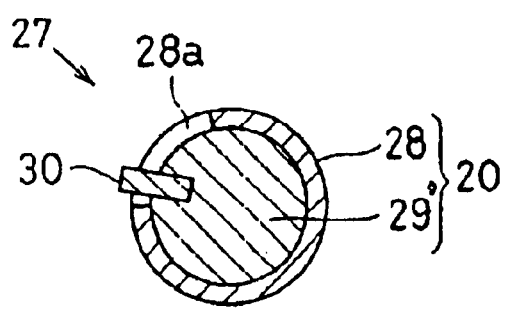

The parallel link mechanism 18 is provided with a tilting mechanism 27 incorporated in the connecting shaft 20 such as shown in FIG. 8A or 8B.

Referring to FIG. 8A showing the tilting mechanism 27, the connecting shaft 20 comprises an outer hollow shaft 28 fixedly mounted to an outer race of the bearing 19 and an inner hollow shaft 29 rotatably fitted in the outer hollow shaft 28 and fixedly mounted between the inner race of the bearing 19 and the connected block 21. The outer shaft 28 has a circumferential slot 28a and, on the other hand, the inner shaft is provided with a projection 29a. The projection 29a is formed by cutting and bending the wall partly outward so as to extend in a radial direction passing through the circumferential slot 28a. The tilting mechanism 27 allows the inner shaft 29 to cause rotational displacement with respect to the outer shaft 28 within the circumferential slot 28a.

FIG. 8B shows an alternative structure of the tilting mechanism 27. In this alternative structure, a rigid inner shaft 29' is used in place of the hollow inner shaft 29. The rigid inner shaft is fixedly provided with a key 30 extending in a radial direction passing through a circumferential slot 28a of a hollow outer shaft 28. The tilting mechanism 27 shown in FIG. 8B is just the same in operation as the tilting mechanism 27 shown in FIG. 8A.

In either structure of the tilting mechanisms 27 shown in FIGS. 8A and 8B, when the sliding door 5 in the closed position a, namely in the door opening 3, is pulled laterally outward from the outside of the vehicle body or pushed laterally outward from the inside of the vehicle body, the tilting mechanism 27 causes the inner shaft 29 to make rotational displacement with respect to the outer shaft 28 in a direction opposite to a direction indicated by an arrow x (see FIG. 7). On the other hand, when the sliding door 5 in the closed position a, namely in the door opening 3, is pushed laterally inward from the outside of the vehicle body or pulled laterally inward from the inside of the vehicle body, the tilting mechanism 27 causes the inner shaft 29 to make rotational displacement with respect to the outer shaft 28 in a direction indicated by the arrow x.

The lower base guide rail 17, that comprises the straight rail portion and the laterally curved front rail portion, is formed with a U-shaped guide channel 17a (see FIG. 9) extending along the entire length. The guide rollers 34 are mounted for sliding movement to the lower base guide rail 17 through engagement in the guide channel 17a. The straight rail portion of the lower base guide rail 17 extends in parallel with the front slider 16F and the rear guide rail 16R of the upper guide rail assembly 16 between positions in a lengthwise directions corresponding to the position e and the position f. The front rail portion extends forward from the straight portion and is curved inward in a transverse direction to gradually draw away from the straight rail portion. The front end of the front portion is located at a lateral distance from the straight rail portion.

In this embodiment, as shown in FIG. 2, the sliding door 5 leans laterally inward in the door opening 3, namely in the closed position a and is, however, kept upright between the position e and the fully open positions f. In order for the sliding door 5 to change in position like this, the door guide mechanism 15 is so dimensionally structured as to cause the sliding door 5 to swing a lateral distance L2 in a transverse direction at its top end and to shift a lateral distance L1 in a transverse direction that is smaller than the lateral distance L2. The lateral distance L2 of swinging movement of the sliding door 5, in particular the top of the sliding door 5, is caused through a change a change in geometrical arrangement of the parallel link mechanism 18 between the folded position shown in FIG. 7 and the expanded position shown in FIG. 6 and relative rotational displacement of between the outer and inner shafts 28 and 29 of the tilting mechanism 27. For this swinging movement, the parallel link mechanism 18 is so configured as to provide parallel movement of the top of the sliding door 5 in a transverse direction that is approximately equal to the lateral distance L1 and the tilting mechanism 27 is so configured as to provide lateral movement of the top of the sliding door 5 in a transverse direction defined by the circumferential length of the circumferential slot 28a that is approximately equal to a difference between the lateral distances L1 and L2. These parallel link mechanism 18 and tilting mechanism 27 are not always limited to these configuration as long as satisfying the condition that the lateral distance L2 is greater than the lateral distance L1.

Figure 9:
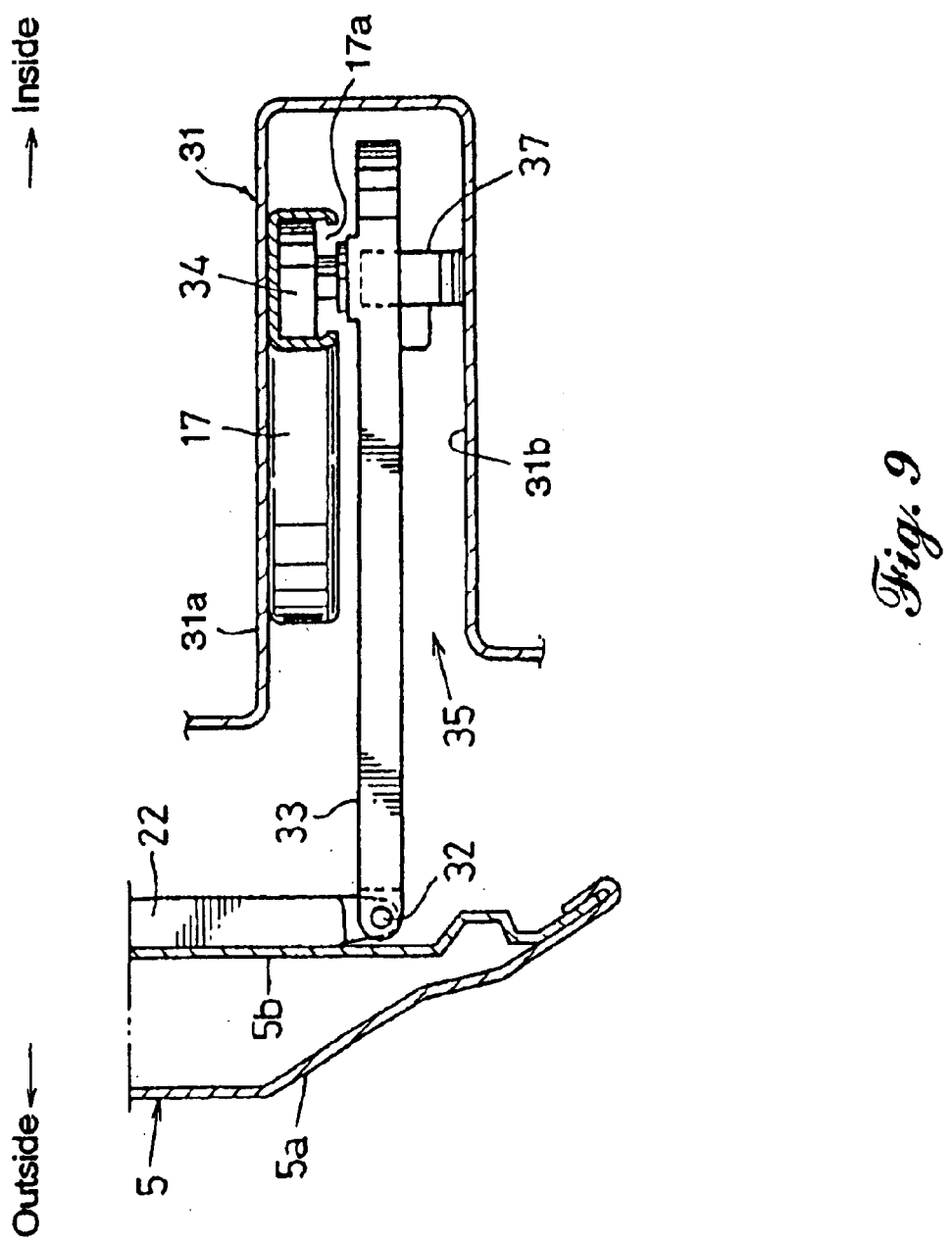
FIG. 9 is a front view of a connecting structure between a lower base guide rail and the sliding door.

As shown in FIGS. 5 and 9, the vehicle has a high rigid double-walled floor panel 31 which comprises a top floor wall 31a and a bottom floor wall 13b connected to each other and is provided with a specified space 35 between these floor walls 31a and 31b. The U-shaped guide channel 17a (see FIG. 9) of the lower base guide rail 17 opens downward and extends along the entire length of the guide rail 17. The lower base guide rail 17 is welded, or otherwise secured, to the under surface of the top floor wall 31a of the floor panel 31. The front rail portion is curved laterally inward so as to gradually draw away from the side body panel 1. The door guide mechanism 15 is pivotally connected to the lower end of the bracket 22 by the pivot pin 32 through the bracket arm 33 and is supported in a substantially horizontal position. The bracket arm 33 is provided with, in addition to the guide rollers 34 mounted for rotation to the top surface thereof, a load bearing roller 37 mounted for rotation to the under surface thereof. The bracket arm 33 is slidably connected to the lower base guide rail 17 through slidable engagement of the guide roller 34 in the guide channel 17a of the lower base guide rail 17. The bracket arm 33 is further supported by the under wall 31b of the floor panel 31 through the load bearing roller 37.

According to the door guide mechanism 15, while the sliding door 5 in the door opening 3 is pushed obliquely rearward from the inside of the vehicle body or pulled obliquely rearward from the outside of the vehicle body, the sliding door 5 is guided by sliding movement of the guide rollers 34 along the laterally curved front portion of the lower base guide rail 17 to gradually shift laterally outward. Simultaneously, at the beginning of pushing or pulling the sliding door 5 obliquely rearward, the sliding door 5 is allowed to swing laterally outward through relative rotational displacement of between the outer and inner shafts 28 and 29 of the tilting mechanism 27. Further, the sliding door 5 is allowed to travel rearward and continuously swing laterally outward through a change in geometrical arrangement of the parallel link mechanism 18 from the folded position shown in FIG. 7 to the expanded position shown in FIG. 6. When the sliding door 5 reaches the position e, the sliding door 5 is put substantially upright.

In the operation of the sliding door 5, when the sliding door 5 in the closed position a shown by a solid line in FIGS. 1 and 4 is pushed obliquely rearward from the inside of the vehicle body or pulled obliquely rearward from the outside of the vehicle door in order to expose the access opening, i.e. the door opening 3, the sliding door 5 travels obliquely rearward from the closed position a to the position e passing through the positions b, c and d. More specifically, the sliding door 5 is guided by sliding movement of the guide rollers 34 along the curved front portion of the lower base guide rail 17 to gradually shift laterally outward. Simultaneously with the shifting movement of the sliding door 5, at the beginning of pushing or pulling the sliding door 5 obliquely rearward, the sliding door 5 is allowed to swing laterally outward through relative rotational displacement of between the outer and inner shafts 28 and 29 of the tilting mechanism 27. During or after the swinging movement of the sliding door 5 through relative rotational displacement between the outer and inner shafts 28 and 29 of the tilting mechanism 27, the sliding door 5 is further allowed to continuously swing laterally outward and, simultaneously to travel rearward through a change in geometrical arrangement of the parallel link mechanism 18 from the folded position shown in FIG. 7 to the expanded position shown in FIG. 6. When the sliding door 5 reaches the position e, the sliding door 5 is put substantially upright.

Figure 10:
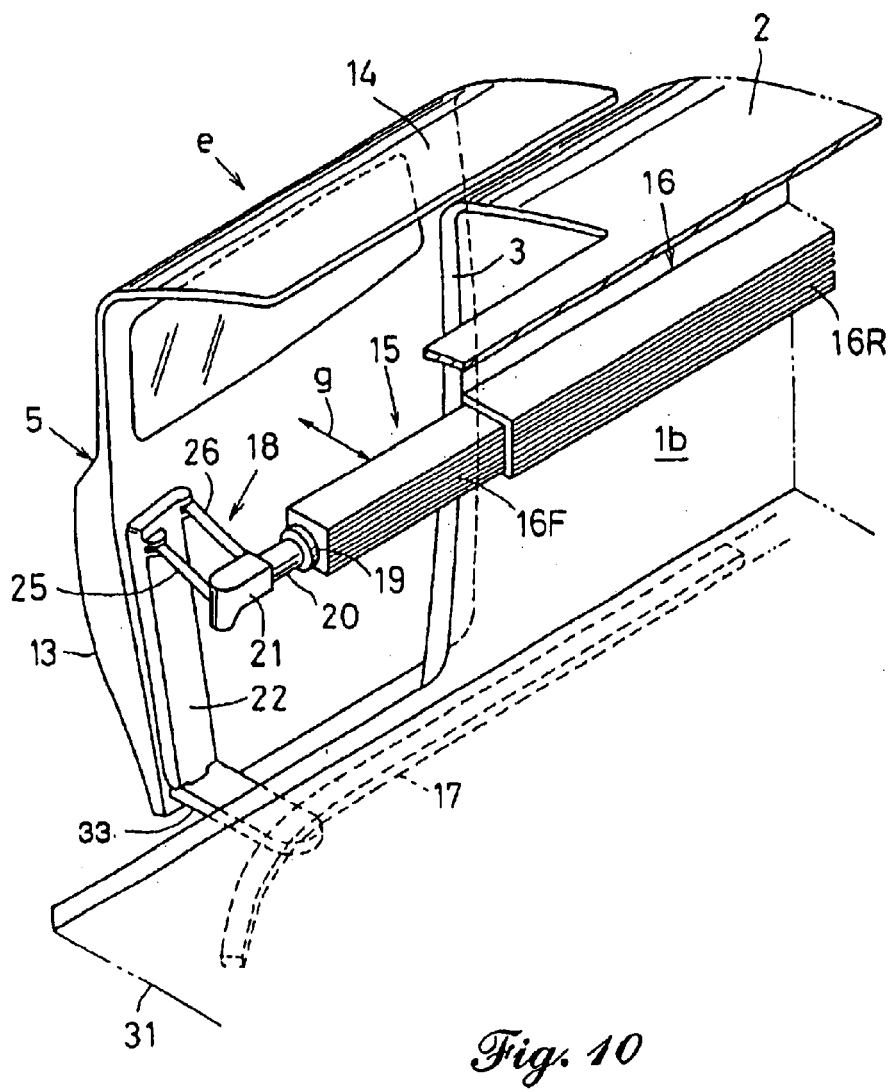
FIG. 10 is a perspective view of the sliding door on the way to an open position.

More specifically, at the beginning of pushing or pulling the sliding door 5 obliquely rearward, the sliding door 5 starts to shift laterally outward in concurrence with its rearward movement following sliding movement of the guide roller 34 guided in the guide channel 17a of the front rail portion of the lower base guide rail 17 and, simultaneously, to swing laterally outward following relative rotational displacement between the outer and inner shafts 28 and 29 of the tilting mechanism 27. While continuously pushing or pulling the sliding door 5 obliquely rearward, the parallel link mechanism 18 is gradually expanded, so as thereby to cause the sliding door 5 to gradually swing the sliding door 5 laterally outward about the pivot pin 32 and to travel rearward. Thus, the sliding door 5 travels laterally rearward. When the sliding door 5 gradually shifts obliquely rearward and swung laterally outward and reaches the position b (see FIG. 1), the sliding door 5, more specifically the roof portion 14, completely comes out of the roof opening portion of the door opening 3. When the sliding door 5 is further pushed or pulled obliquely rearward to the position e passing through the positions b and c, the sliding door 5 further shifts laterally outward in concurrence with its rearward movement following sliding movement of the guide roller 34 guided in the guide channel 17a of the front rail portion of the lower base guide rail 17 and, simultaneously, further gradually swings laterally outward due to expansion of the parallel link mechanism 18. The sliding door 5 causes lateral shift movement of the distance L1 and lateral swing movement of the distance L2 both in a transverse direction until the sliding door 5 reaches the position e. Since the tilting mechanism 27 causes the sliding door 5 to swing a lateral distance equal to a difference (L2−L1) between the lateral shift distance (L1) and the lateral swing distance (L2) of the sliding door 4, the sliding door 5 is put substantially upright in the position e. This multi-motion opening operation of the sliding door 5 is completed when the sliding door 5 reaches the position e (FIG. 1). During the opening operation of the sliding door 5, the upper guide rail assembly 16 allows the front slider 16F to retract into the rear guide rail 16R, so as to reliably guide rearward movement of the sliding door 5. As shown in FIG. 10 wherein the sliding door 5 is in the position e, the sliding door 5 partly exposes the access opening, i.e. the door opening 3, and provides a space distance g from the front slider 16F of the upper guide rail assembly 16.

When the sliding door 5 is further pulled or pushed rearward from the position e, the sliding door 5 travels following sliding movement of the guide rollers 34 guided in the guide channel 17a of the straight rail portion of the lower base guide rail 17 and retraction of the front slider 16F into the rear guide rail 16R. During this rearward movement from the positions e and the fully open position f, the sliding door 5 keeps itself upright. When the sliding door 5 finally reaches the positions, it exposes the access opening, i.e. the door opening 3, entirely.

On the other hand, when the sliding door 5 is pulled forward from the position f in order to close the access opening, i.e. the door opening 3, the sliding door 5 travels forward following sliding movement of the guide roller 34 guided in the guide channel 17a of the straight rail portion 17S of the lower base guide rail 17 keeping itself upright until the sliding door 5 reaches the position e (FIG. 10). When the sliding door 5 is further pulled or pushed forward from the position e, the guide roller 34 enters the guide channel 17a of the curved front rail portion of the lower base guide rail 17, so that the sliding door 5 gradually shifts back laterally inward following sliding movement of the guide roller 34 guided in the guide channel 17a of the front rail portion of the lower base guide rail 17. Simultaneously with the shifting movement, the sliding door 5 folds the parallel link mechanism 18 so as thereby to gradually swing back laterally inward. During folding the parallel link mechanism 18, the tilting mechanism 27 causes relative rotational displacement between the outer and inner shafts 28 and 29, Accordingly, when the sliding door 5 reaches the position a passing through the positions d, c and b, the sliding door 5 is tilted to completely close the access opening, i.e. the door opening 3.

In the closed position a, the sliding door 5, more specifically the side portion 13 and the roof portion 14, are substantially flush with the surfaces of the side body panel 1 and the roof panel 2, respectively. Further, in the closed position a, there is provided reliable sealing between the sliding door 5 and the front door 6 by the sealing strip 12.

As described above with reference to FIGS. 1 through 10 showing the sliding door structure for a vehicle having the door opening 3 continuously extending from the side body panel 1 to the roof panel 2 according to an embodiment of the present invention, the sliding door structure comprises the sliding door 5 having a side portion 13 and a roof portion 14, the door guide mechanism 15 operative to guide forward and backward movement of the sliding door 5 at its middle position in a vertical direction so as to open and close an access opening, i.e. the door opening 3. The door guide mechanism 15 comprises the upper guide rail assembly 16 operative to guide the sliding door 5 in a lengthwise direction and the lower base guide rail 17 operative to shift and swing the sliding door 5. Since the sliding door structure has no overhead guide rail operative to guide a top of the sliding door 5, the sliding door 5 in the open position provides improved facility and convenience of getting on and off the vehicle. The sliding door structure is significantly effective especially in sporty vehicles that are made low in vehicle height in light of vehicle design requirements.

The upper guide rail assembly 16 is positioned in the inside of the vehicle. This structure provides the vehicle with an improved attractive outer appearance and, in addition, allows the upper guide rail assembly 16 to have any desired configuration without being dependent on shapes of vehicle body. The upper guide rail assembly 16 can be large in length in order to provide a wide access opening. The upper guide rail assembly 16 that juts out into a passenger compartment and has a horizontal top surface is utilized as an arm rest. Further, the upper guide rail assembly 16 has a nested construction comprising a rear guide rail 16R formed by a boxed channel member and a front slider 16F fitted for sliding lengthwise movement in a lengthwise direction in the rear guide rail 16R. This nested construction of the upper guide rail assembly 16 enables the makes both front slider 16F and rear guide rail 16R while the sliding door 5 is closed and enables a passenger to open the sliding door 5 without manually retracting the front slider 16F into the rear guide rail 16R. This provides the passenger with improved facility and convenience of getting on and off the vehicle. The upper guide rail assembly 16 cooperates with a shift means such as the parallel link mechanism 18 in swinging the sliding door 5 laterally in a transverse direction. Accordingly, the sliding door structure is simple in the mechanism for causing swing movement of the sliding door 5 in a transverse direction simultaneously with movement of the sliding door 5 in a lengthwise direction.

Figure 11:
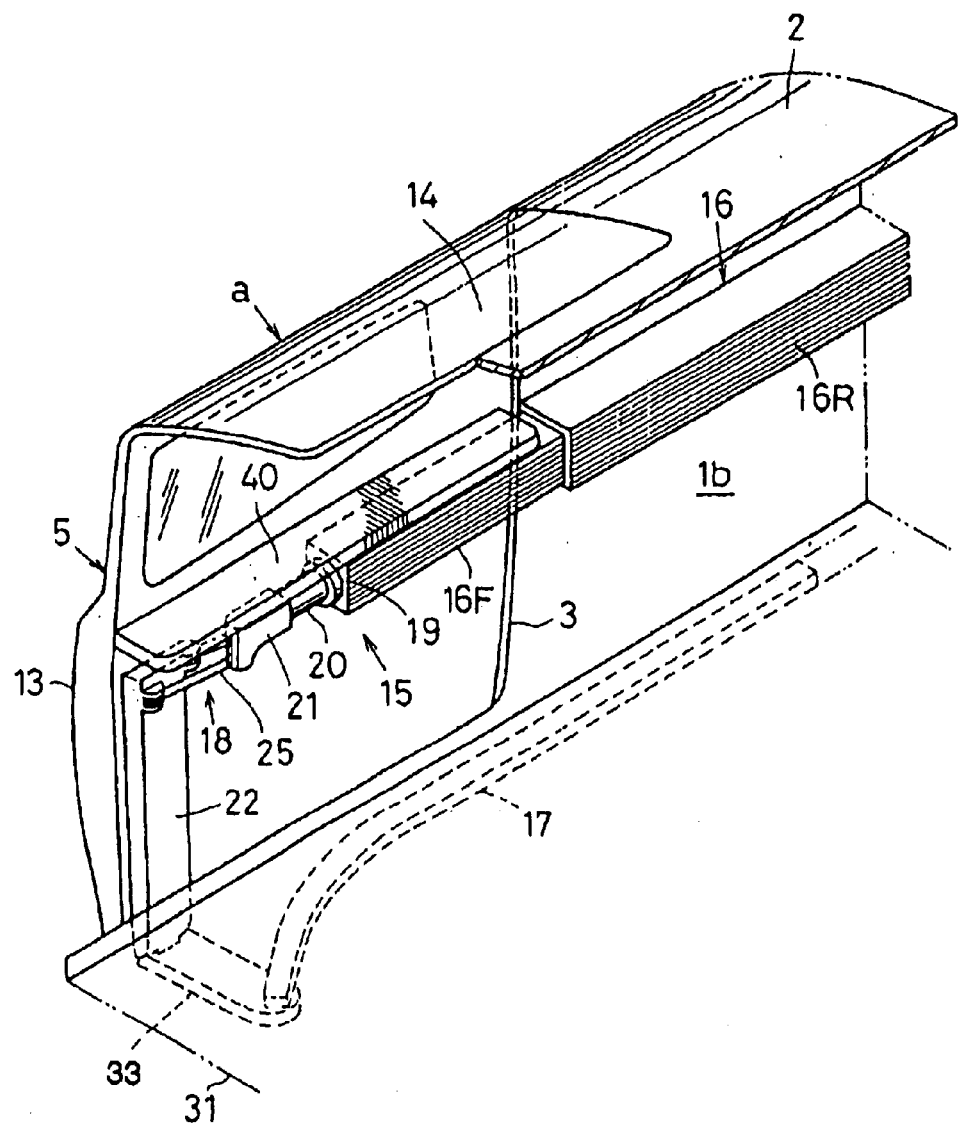
FIG. 11 is a perspective view of a sliding door structure for a vehicle according to another embodiment of the present invention.
Figure 12:
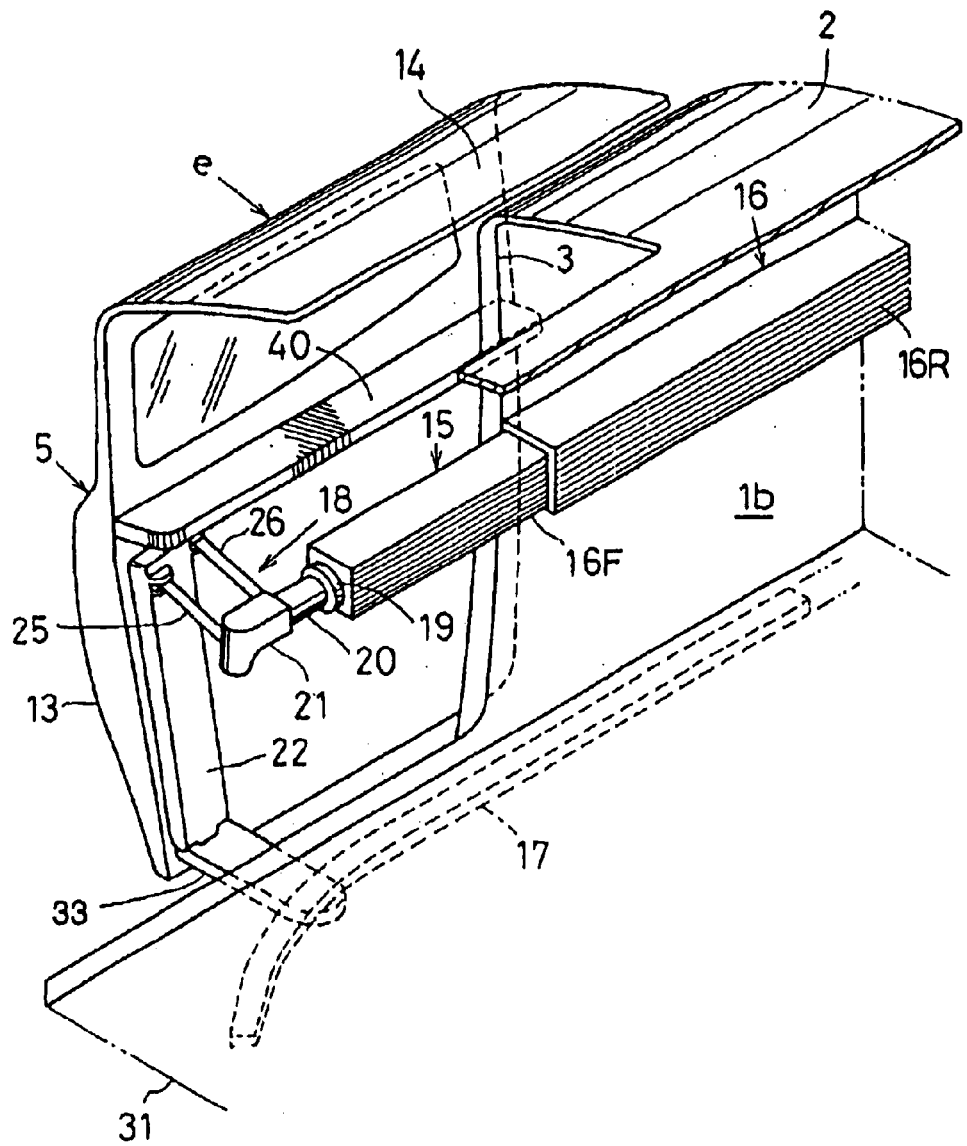
FIG. 12 is a perspective view of the sliding door on the way to an open position.

FIGS. 11 and 12 show a sliding door structure according to an alternative embodiment of the present invention in which an arm rest 40 is fixedly attached to a sliding door 5 so as to cover a front slider 16F fitted for sliding movement in a lengthwise direction in a rear guide rail 16R of an upper guide rail assembly 16. More specifically, the upper guide rail assembly 16 has a nested construction comprising a rear guide rail 16R formed by a boxed channel member and a front slider 16F fitted for sliding movement in a lengthwise direction in the rear guide rail 16R. The rear guide rail 16R is welded, or otherwise secured, to an inner panel 1b of a side body panel 1 and juts out into a passenger compartment of the vehicle. The arm rest 40 is fixedly attached to the inner panel 1b of the side body panel 1 so as to overhang above the front slider 16F and a parallel link mechanism 18 connected between the upper guide rail assembly 16 and the sliding door 5. The arm rest 40 is adapted to draw laterally away from the front slider 16F when the sliding door 5 shifts and swings laterally outward to open the access opening, i.e. the door opening 3.

According to the sliding door structure, the arm rest 40 covers the front slider 16F while the sliding door 5 is in the closed position and draw upward and laterally outward away from the front slider 16F when the sliding door 5 is opened. Therefore, a passenger does not need to manually operate the arm rest 40 when getting on and off the vehicle.

Figure 13:
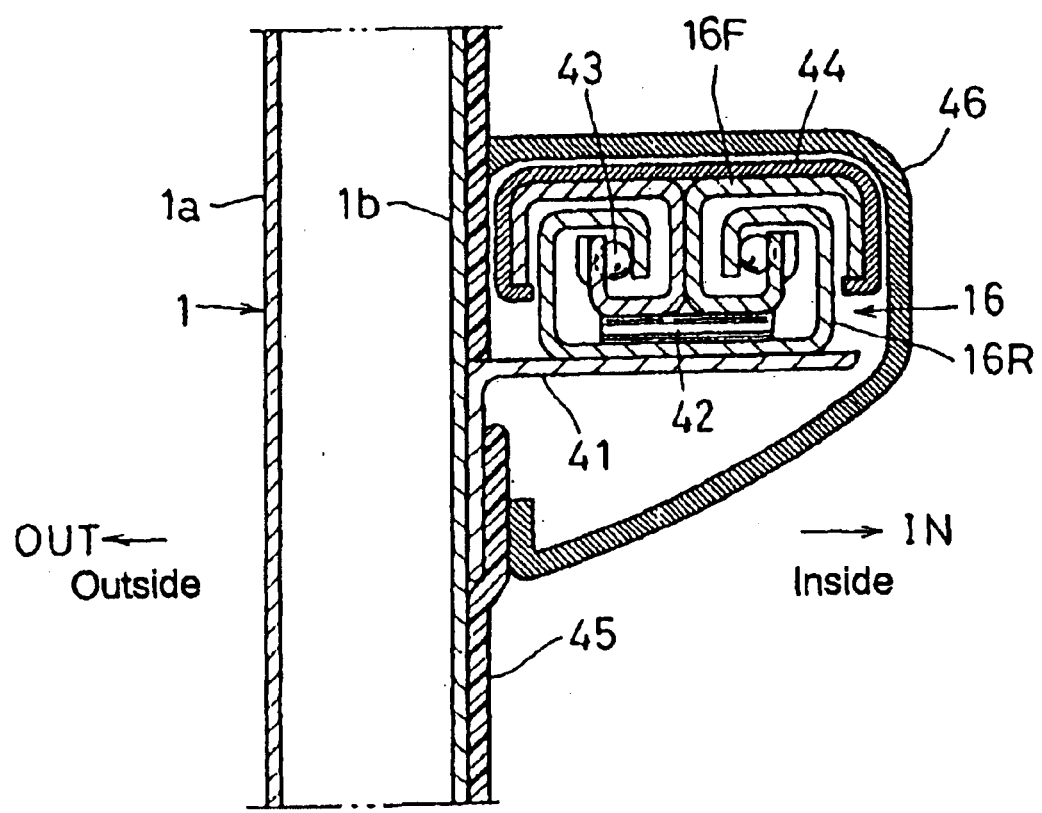
FIG. 13 is a cross-sectional view of a sliding door structure for a vehicle according to a further embodiment of the present invention.

FIG. 13 shows a sliding door structure according to another embodiment of the present invention in which an upper guide rail assembly 16 is equipped with a movable front arm rest and a fixed rear arm rests. As shown, a side body panel 1 comprises an outer panel 1a and an inner panel 1b. The inner panel 1b is provided with a reverse L-shaped mounting bracket 41 secured thereto. The upper guide rail assembly 16 comprises a U-shaped rear guide rail 16R opening upward, a double-channeled front slider 16F fitted for sliding movement in a lengthwise direction in the U-shaped rear guide rail 16R and a plurality of rollers 42 and balls 43 appropriately disposed between the front slider 6F and the rear guide rail 16R. The front slider 16F is covered by a front arm rest 44. The front slider 16F slides on the rear guide rail 16F when a sliding door (not shown) is being opened. Therefore, the front arm rest 44 functions as a movable arm rest. Further, the front slider 16F completely overlaps the rear guide rail 16F when the sliding door is completely opened.

The sliding door structure further includes a rear arm rest 46 fixed to the inner panel 1b forming part of the side body panel 1 through a trim member 45. The rear arm rest 46 is so shaped as to conceal the front slider 16R and the rear guide rail 16R overlapping each other and the mounting bracket 41 entirely.

It is to be understood that although the present invention has been described with regard to preferred embodiments thereof various other embodiments and variants may occur to those skilled in the art, which are within the scope and spirit of the invention, and such other embodiments and variants are intended to be covered by the following claims.

What is claimed is:

1. A sliding door structure for a vehicle having a door opening extending from a side body panel of a vehicle body to a roof panel of the vehicle body, sliding door structure comprising:

a sliding door slidably mounted on one side of a vehicle body for sliding movement in a lengthwise direction of the vehicle body between a closed position in said door opening and an opening position wherein said sliding door extends along an outer surface of said side body panel to fully expose said door opening and having a side portion in conformity in configuration with a side opening portion of the door opening and a roof portion in conformity in configuration with a roof opening portion of the door opening; and a guide mechanism for guiding said sliding movement of said sliding door, said guide mechanism putting said roof portion of said sliding door substantially flush with said roof panel in said closed position and causing said sliding door to shift and swing outward in a transverse direction of the vehicle body so that said roof of said sliding door completely comes out of said roof opening portion of the door opening and to travel rearward in said lengthwise direction at the beginning of opening operation of said sliding door from said closed position toward said closed position;

said guide mechanism comprising:

an upper slide guide assembly comprising a rear guide rail secured to a middle portion of said vehicle body in a vertical direction and a front slider slidably supported by said rear guide rail, so as to overlap said rear guide rail when said sliding door travels in said lengthwise direction;

a swinging mechanism operationally connected between said front slider and said sliding door so as to cause said sliding door to swing laterally in said transverse direction when said sliding door travels in said lengthwise direction; and a base slide guide rail secured to said vehicle body and connecting for said sliding door to said vehicle body for slide movement of said sliding door relative to said vehicle door so that said base slide guide rail causes said sliding door to shift laterally in said transverse direction when said sliding door travels in said lengthwise direction.

2. The sliding door structure as defined in claim 1, wherein said swinging mechanism comprises a parallel link mechanism.

3. The sliding door structure as defined in claim 2, wherein said swinging mechanism is provided with means for absorbing an inclination of said sliding door due to a difference between a distance of said shift movement and a distance of said swing movement.

4. The sliding door structure as defined in claim 1, wherein said upper slide guide assembly is disposed inside said vehicle body.

5. The sliding door structure as defined in claim 4, wherein said upper slide guide assembly juts out into a passenger compartment of said vehicle body so as to provide a flat surface serving as an arm rest.

6. The sliding door structure as defined in claim 5, wherein said upper slide guide assembly has a nested construction comprising a rear guide rail extending in said lengthwise direction and secured to said vehicle body and a front slider slidably supported by said rear guide rail and being put alongside said sliding door in said door opening, said front slider being guided by and sliding to overlap said rear guide rail when said sliding door travels in said lengthwise direction to open said door opening.

7. The sliding door structure as defined in claim 6, and further comprising an arm rest fixedly attached to said sliding door and jutting out into a passenger compartment of said vehicle so as to overhang above said front slider when said sliding door is in said door opening and to draw laterally away from said front slider when the sliding door swings and shifts outward in a transverse direction.

8. The sliding door structure as defined in claim 7, and further comprising a rear arm rest fixedly attached to said side body panel and jutting out into a passenger compartment of said vehicle, said rear arm rest being so shaped as to conceal said rear guide rail.

9. The sliding door structure as defined in claim 8, and further comprising a front arm rest fixedly attached to said front slider, wherein said rear arm rest conceals said front arm rest attached to said front slider when said sliding door is in said door position.

10. The sliding door structure is defined in claim 1, wherein said sliding door is slidably supported by said vehicle body adjacent to a front door hinged to said vehicle body at a front end of said front door so as to open and close a front door opening in said said body panel and is provided with a sealing member secured to a forward end of said sliding door, said sealing member being brought into abutment against a rearward end of said front door in said front door opening so as to overlap an inner rear edge of said front door when said sliding door is completely put in said door opening.

* * * * *